July 26, 1927.
F. C. OWEN
1,637,238
ELECTRICAL TRANSFORMER
Filed May 1, 1926
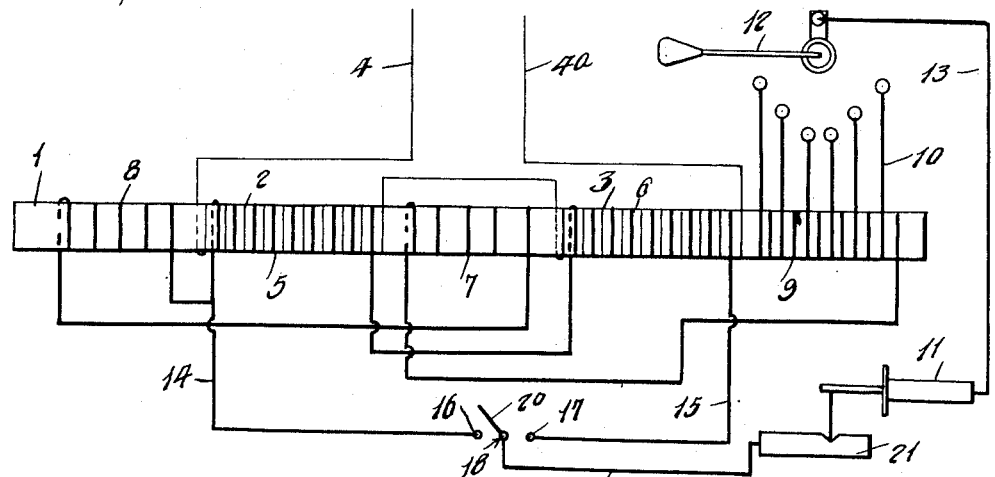
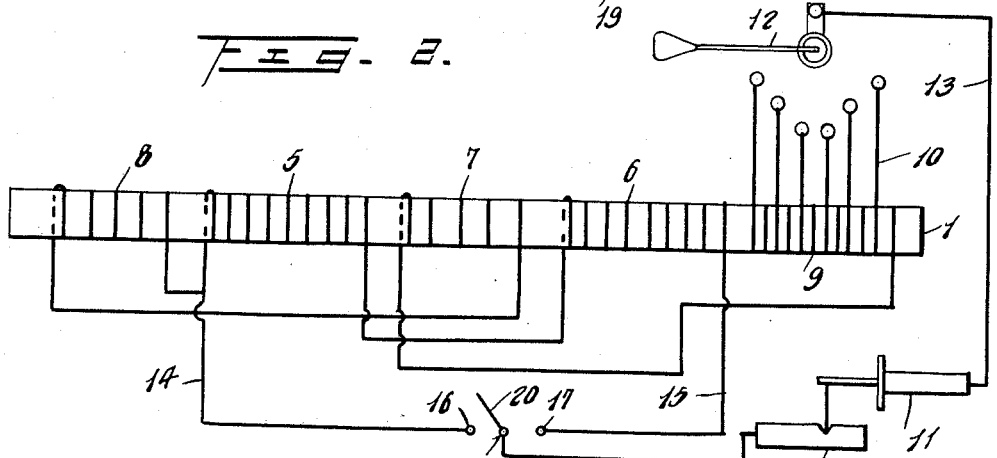
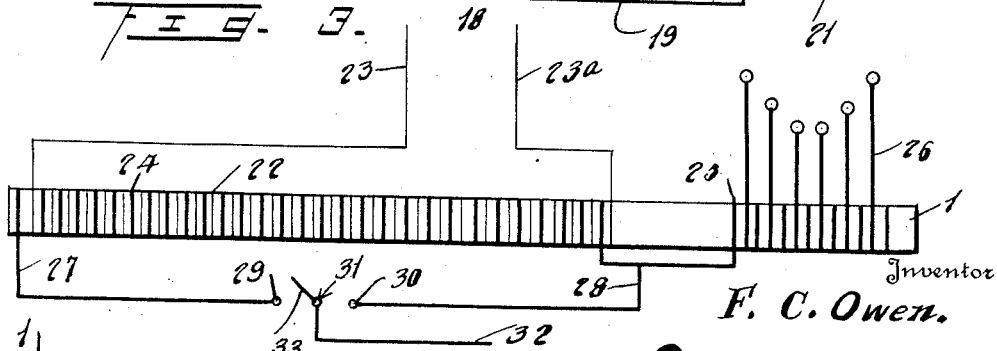
Inventor
F. C. Owen.

Patented July 26, 1927.

1,637,238

UNITED STATES PATENT OFFICE.

FREDERICK CARLISLE OWEN, OF FAYETTEVILLE, NORTH CAROLINA.

ELECTRICAL TRANSFORMER.

Application filed May 1, 1926. Serial No. 106,112.

This invention relates to electrical transformers, and has for one of its objects the provision of a novel device of this character which shall have a comparatively high power factor and which shall be adapted to function as the load decreases to effect a proportionate reduction of the voltage in the secondary circuit and as the load increases to effect a proportionate increase in the voltage of the secondary circuit.

A further object of the invention is to provide a transformer which will function as stated without the aid of damping devices, rheostats, resistances and the like, and which shall be capable of withstanding a full load short circuit for a period of several hours without overheating.

A further object of the invention is the provision of a transformer of the character stated which shall involve an extremely simple construction and which may be manufactured and sold at a comparatively low cost.

With the foregoing and other objects in view, the nature of which will appear as the description proceeds, the invention consists of the combination and arrangement of parts hereinafter fully described and claimed, and illustrated in the accompanying drawing.

While the transformer is capable of and intended for general application, it is especially adapted for use in connection with alternating current electric cutting and welding apparatus, and is shown in this connection in the drawing wherein:

Figure 1 is a diagrammatic view of an arc cutting and welding apparatus embodying the transformer, Figure 2 is a similar view with the primary winding omitted, Figure 3 is a similar view of a slightly modified form of the transformer, and Figure 4 is a detail view of a fragmentary portion of the core.

Corresponding and like parts are referred to in the following description, and designated in the several views of the accompanying drawing, by similar reference characters.

The transformer comprises a laminated core 1 which is straight and provides an open magnetic circuit.

The primary circuit or winding of the transformer comprises connected coils 2 and 3 which are arranged on the core 1 in relatively spaced relation and in spaced relation to the ends thereof. These coils may be connected in any suitable manner, as for instance in parallel, in parallel series or in series, and wound for single phase or polyphase circuits. Leads 4 and 4ª extending from any suitable source of current supply, are connected to the terminals of the primary winding.

The secondary circuit or winding of the transformer comprises main or voltage regulating coils 5 and 6 which are closely interlinked with the primary coils 2 and 3, and auxiliary or current regulating coils 7, 8 and 9 of which the coil 7 is arranged on the core 1 between the primary coils 2 and 3. The secondary coils 8 and 9 are arranged on the core 1 outwardly beyond the primary coils 2 and 3. The secondary coils 5–9 may be connected in any suitable manner as for instance in parallel, in series or in parallel series. The main or voltage regulating coils 5 and 6 preferably have the same number of turns or convolutions, the auxiliary or current regulating coils 7 and 8 preferably have the same number of turns or convolutions and have fewer turns or convolutions than the coils 5 and 6, and the auxiliary or current regulating coil 9 preferably has a greater number of turns or convolutions than any of the other of these coils.

Tap leads 10 extend from the turns or convolutions of the auxiliary or current regulating coil 9, any one of which may be connected to the electrode 11 by a switch 12 which in turn is connected to the electrode by a lead 13. Leads 14 and 15 extend from the outer ends of the main or voltage regulating coils 5 and 6 to contacts 16 and 17 of a switch 18, and a lead 19 extends from the blade 20 of the switch to the work 21. The switch 18 permits the main or voltage regulating coils 5 and 6 to be cut in or out of the secondary circuit of the transformer.

Practically all the flux developed by the primary winding will thread the main or voltage regulating coils 5 and 6, because of the close association of these coils with the primary coils 2 and 3. As the result the voltage generated in the coils 5 and 6 remains practically the same at all times, and does not vary with the load.

The auxiliary or current regulating coils 7, 8 and 9, being remote from the primary coils 2 and 3 tend to set up a flux independent of and opposed to that generated by the primary coils. These opposing fluxes cause a leakage to take place which increases as the load increases and decreases as the load decreases and which is forced out of the core 1 at the ends thereof and at the inner terminals of the auxiliary or current regulating coils 7, 8 and 9.

As the result of such leakage, the heavy secondary flux causes the auxiliary or current regulating coils 7, 8 and 9 to develop high inductance, and act as impedance coils, so that the phase of the voltage in these coils is shifted. The resulting voltage of the arc is therefore reduced, or at least prevented from increasing as the current increases. The impedance action increases with the load, so that even on short circuit serves to prevent an excessive or dangerous flow of current. Thus a stable arc is maintained.

In the modified form of the transformer shown in Figure 4, the primary winding consists of but a single coil 22 which occupies the greater portion of the core 1 and to the terminals of which are connected leads 23 and 23ᵃ extending from any suitable source of current supply. The secondary circuit comprises a main or voltage regulating coil 24 and an auxiliary or current regulating coil 25. This transformer operates substantially the same as the one shown in Figures 1 and 2. The auxiliary or current regulating coil 25 is provided with a plurality of tap leads 26, and leads 27 and 28 extending from the terminals of the main or voltage regulating coil 24 are connected to contacts 29 and 30 of a switch 31. Any of the leads 26 may be connected to the electrode by a switch and lead similar to those shown in Figures 1 and 2, and either end of the main or voltage regulating coil 24 may be connected to the work by the switch 31 and a lead 32 extending from the blade 33 of the switch to the work. If desired the transformer may be further modified by omitting the coil 8.

What is claimed is:—

1. A transformer comprising a straight core providing an open magnetic circuit, a primary winding having coils arranged in spaced relation on the core, and a secondary winding having coils interlinked with the primary winding, a coil located between the coils of the primary winding, and coils located outwardly beyond the coils of the primary winding.

2. A transformer comprising a core providing an open magnetic circuit, a primary winding having coils arranged in spaced relation on the core, a secondary winding having voltage regulating coils interlinked with the primary winding, a current regulating coil located between the coils of the primary winding and current regulating coils located outwardly beyond the coils of the primary winding, and means by which the voltage regulating coils can be cut in and out of the secondary circuit.

In testimony whereof I affix my signature.

FREDERICK CARLISLE OWEN.